United States Patent
Wang

(10) Patent No.: US 10,552,944 B2
(45) Date of Patent: Feb. 4, 2020

(54) IMAGE UPSCALING WITH CONTROLLABLE NOISE REDUCTION USING A NEURAL NETWORK

(71) Applicant: Adobe Inc., San Jose, CA (US)

(72) Inventor: Zhaowen Wang, San Jose, CA (US)

(73) Assignee: Adobe Inc., San Jose, CA (US)

(*) Notice: Subject to any disclaimer, the term of this patent is extended or adjusted under 35 U.S.C. 154(b) by 97 days.

(21) Appl. No.: 15/784,039

(22) Filed: Oct. 13, 2017

(65) Prior Publication Data
US 2019/0114742 A1  Apr. 18, 2019

(51) Int. Cl.
| G06K 9/62 | (2006.01) |
| G06K 9/40 | (2006.01) |
| G06K 9/32 | (2006.01) |
| G06T 3/40 | (2006.01) |
| G06T 5/00 | (2006.01) |
| G06F 3/0482 | (2013.01) |

(52) U.S. Cl.
CPC .......... *G06T 3/4046* (2013.01); *G06K 9/6253* (2013.01); *G06T 3/4076* (2013.01); *G06T 5/002* (2013.01); *G06F 3/0482* (2013.01); *G06T 2200/24* (2013.01); *G06T 2207/20081* (2013.01); *G06T 2207/20084* (2013.01)

(58) Field of Classification Search
USPC .................................. 382/157, 57, 275, 299
See application file for complete search history.

(56) References Cited

U.S. PATENT DOCUMENTS

| 7,724,287 B2 * | 5/2010 | Cazier ................. H04N 5/2621 348/222.1 |
| 7,983,511 B1 * | 7/2011 | Chan ...................... G06K 9/40 382/266 |
| 8,537,179 B2 * | 9/2013 | Moriya ................. G06T 5/004 345/428 |
| 8,655,109 B2 | 2/2014 | Lin et al. |
| 8,805,120 B2 * | 8/2014 | Min ..................... G06T 3/4046 382/224 |
| 8,861,868 B2 | 10/2014 | Shechtman et al. |
| 8,917,948 B2 | 12/2014 | Jin et al. |
| 9,123,138 B2 | 9/2015 | Lin et al. |
| 9,251,569 B2 | 2/2016 | Hsieh et al. |
| 9,436,893 B2 | 9/2016 | Yang et al. |

(Continued)

OTHER PUBLICATIONS

Sharma et al, Deep Learning Based Frameworks for Image Super-Resolution and Noise-Resilient Super Resolution, 2017, IEEE, pp. 744-751 (Year: 2017).*

(Continued)

*Primary Examiner* — Kathleen Y Dulaney
(74) *Attorney, Agent, or Firm* — Brake Hughes Bellermann LLP

(57) ABSTRACT

Systems and techniques for converting a low resolution image to a high resolution image include receiving a low resolution image having one or more noise artifacts at a neural network. A noise reduction level is received at the neural network. The neural network determines a network parameter based on the noise reduction level. The neural network converts the low resolution image to a high resolution image and removes one or more of the noise artifacts from the low resolution image during the converting by the using the network parameter. The neural network outputs the high resolution image.

18 Claims, 4 Drawing Sheets

(56) References Cited

U.S. PATENT DOCUMENTS

| | | | |
|---|---|---|---|
| 2004/0260662 A1* | 12/2004 | Staelin | G06N 3/08 706/16 |
| 2006/0204054 A1* | 9/2006 | Steinberg | H04N 5/232 382/118 |
| 2008/0205796 A1* | 8/2008 | Jonsson | G06F 3/04847 382/311 |
| 2012/0294515 A1* | 11/2012 | Chida | H04N 5/367 382/159 |
| 2014/0072242 A1* | 3/2014 | Wei | H04N 19/176 382/299 |
| 2014/0368509 A1* | 12/2014 | Lin | G06T 3/40 345/428 |
| 2015/0030258 A1* | 1/2015 | Chen | G06T 5/002 382/266 |
| 2015/0036943 A1 | 2/2015 | Lin | |
| 2016/0048982 A1* | 2/2016 | Dhanantwari | G06T 11/003 382/131 |
| 2017/0161876 A1 | 6/2017 | Carr et al. | |
| 2018/0075581 A1* | 3/2018 | Shi | G06T 3/4053 |
| 2018/0137605 A1* | 5/2018 | Otsuka | G06T 7/11 |
| 2018/0240257 A1* | 8/2018 | Li | G06T 11/60 |

OTHER PUBLICATIONS

Bao et al, Iterative Convolutional Neural Network for Noisy Image Super Resolution, 2017, IEEE, pp. 4038-4042 (Year: 2017).*

Lu et al, "RObust Face Super-Resolution via Locality-Constrained Low-Rank Representation" IEEE, 2017, pp. 13103-13117 (Year: 2017).*

Chappalli et al, Simultaneous Noise Filtering and Super-Resolution With Second-Generation Wavelets IEEE 2005, pp. 772-775 (Year: 2015).*

Dong, Chao, et al., "Learning a Deep Convolutional Network for Image Super-Resolution", in Proceedings of European Conference on Computer Vision (ECCV), 2014, 16 pages.

Han, Y, et al., "Dictionary learning based noisy image super-resolution via distance penalty weight model". PLoS ONE 12(7): e0182165., 2017, 27 pages.

Qiu, Fang, et al., "Noisy image super-resolution with sparse mixing estimators." In Image and Signal Processing (CISP), 2011 4th International Congress on, vol. 2, IEEE, 2011, pp. 1081-1085.

Shi, Wenzhe, et al., "Real-Time Single Image and Video Super-Resolution Using an Efficient Sub-Pixel Convolutional Neural Network", The IEEE Conference on Computer Vision and Pattern Recognition (CVPR), 2016, 10 pages.

Singh, Abhishek et al., "Super-resolving noisy images." In Proceedings of the IEEE Conference on Computer Vision and Pattern Recognition, 2014, pp. 2846-2853.

Wang, Zhaowen, et al., "Deep Networks for Image Super-Resolution with Sparse Prior" International Conference on Computer Vision (ICCV), 2015, 9 pages.

Adobe Photoshop User Guide, "Resize Images", retrieved from https://helpx.adobe.com/photoshop/using/resizing-image.html, published Feb. 15, 2017, 6 pages.

* cited by examiner

IMAGE UPSCALING WITH CONTROLLABLE NOISE REDUCTION USING A NEURAL NETWORK

TECHNICAL FIELD

This description relates to image upscaling with controllable noise reduction using a neural network.

BACKGROUND

Single image upscaling, or image super-resolution (SR), may use systems and techniques to obtain a high-resolution (HR) image from a low-resolution (LR) image. Issues may occur when upscaling a LR image with potential noise corruption, such as Joint Photographic Experts Group (JPEG) compression artifacts, sensor noise and/or other noise. Various noises are inevitable in digital images. Some noises are not perceivable in the original image resolution, but the noises may become strong artifacts after the images are upscaled using general upscaling techniques such that the noise is perceivable in the upscaled HR image. Upscaling techniques designed for noise-free images may have challenges distinguishing between noise and signal in image data. One approach to deal with this problem is to apply a de-noising operation as a first process to reduce the noise level in the low-resolution (LR) image, and then to upscale the image in a separate second process so that the result high-resolution (HR) image has less artifacts. A de-noising process is a process to reduce the noise in the image, where noise may generally refer to noise corruption as discussed above. One consequence of this two-step process is that any de-noising operation will also smooth out some original signal details, causing more blur in the resulting HR image.

More recently, neural networks, including deep neural networks, have been used in single image upscaling. Despite using neural networks in single image upscaling, challenges and problems remain, including the ones described above with respect to noise present in the original image resolution. As above, some upscaling techniques using neural networks treat the de-noising and upscaling processes as two independent processes and combine the results from the two processes in an ad-hoc manner.

In general, neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network.

Each neural network is trained for a specific task, e.g., image upscaling, prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being tweaked over thousands of rounds of training until arriving at the optimal, or most accurate, values. In the context of neural networks, the parameters are initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

SUMMARY

According to one general aspect, systems and techniques for converting a low resolution image to a high resolution image include receiving a low resolution image having one or more noise artifacts at a neural network and receiving a noise reduction level at the neural network. The neural network determines a network parameter based on the noise reduction level. The neural network converts the low resolution image to a high resolution image and removes one or more of the noise artifacts from the low resolution image during the converting using the network parameter. The neural network outputs the high resolution image.

Implementations may include one or more of the following features. For example, the neural network may convert the low resolution image to the high resolution image and remove one or more of the noise artifacts at a same time. The received noise reduction level may be from one of a multiple user-selectable noise reduction levels.

The neural network includes a weight composing network and an upscaling network. The weight composing network determines the network parameter based on the noise reduction level. The upscaling network uses the network parameter determined by the weight composing network to convert the low resolution image to the high resolution image and to remove one or more of the noise artifacts from the low resolution image.

In some implementations, the weight composing network is configured to receive the noise reduction level from multiple possible noise reduction levels and the weight composing network includes multiple network parameters, where each of the network parameters is shared by multiple different noise reduction levels from the multiple possible noise reduction levels. The weight composing network and the upscaling network may be jointly trained using multiple low resolution images having known different noise levels paired with corresponding high resolution images having no noise.

The details of one or more implementations are set forth in the accompa-nying drawings and the description below. Other features will be apparent from the description and drawings, and from the claims.

DETAILED DESCRIPTION

Figure 1:
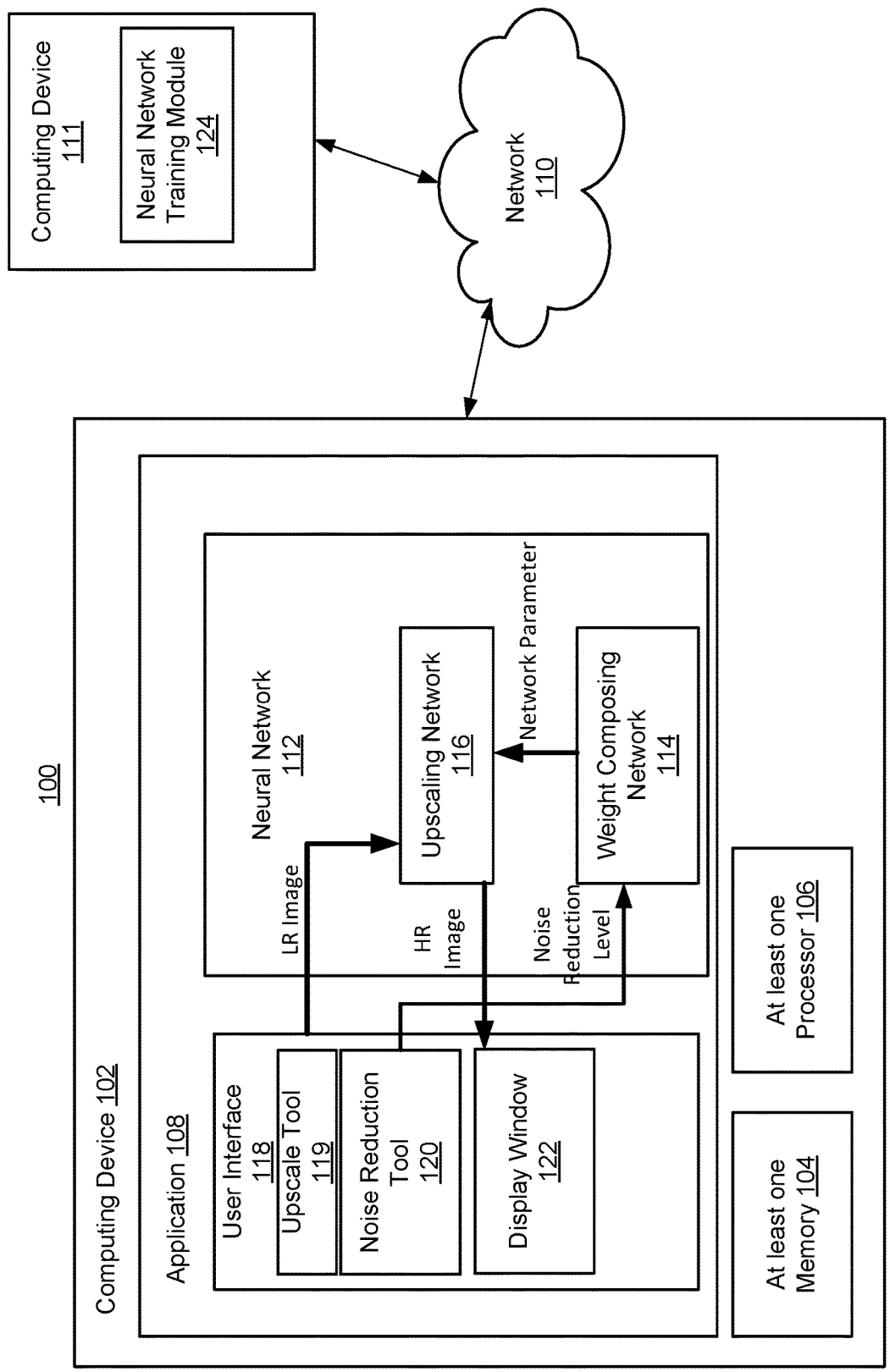
FIG. 1 is a block diagram of a system for image upscaling using a neural network.

Systems and techniques use a single neural network to upscale a LR image to an HR image and reduce the noise (also referred to as de-noising or noise reduction) in the image at the same time. The single neural network achieves both de-noising and upscaling of the LR image to the HR image simultaneously. A single process is used to perform noise reduction and upscaling for an input image in contrast to conventional techniques of using a pre-processing step to perform noise reduction directly on the image and then to perform upscaling on the image.

The single neural network includes a weight composing network and an upscaling network with an image input to the upscaling network and a user-controllable noise reduction level input to the weight composing network. The user-controllable noise reduction level input allows users to choose the best trade-offs between noise reduction and detail preservation. The single neural network takes a LR image and an integer noise level as inputs. The single neural network estimates the best HR image result corresponding to a given input noise reduction level. A graphical user interface (GUI) is used to enable user-control of the noise reduction level and to allow viewing of the results of the upscaling and noise reduction process on the image output from the neural network. The GUI enables the user to select and change the noise reduction level and to view the results of the combined upscaling and noise reduction process for different noise reduction levels.

Using the single neural network to perform both noise reduction and upscaling at the same time preserves the detail information of the image signals to the maximum extent. This is advantageous over prior systems and techniques that first performed a noise reduction process directly on the image, which may cause some detail information of the image signals to be lost and not available or recoverable for the image upscaling process.

In the single neural network that performs both noise reduction and upscaling, the noise reduction input adjusts the weights that are calculated by the weight composing network and the weights, or network parameter, output from the weight composing network are used as input to the upscaling network. In this manner, the noise reduction is independent of the size of the image. The image is not being input into the weight composing network, but instead is input into the upscaling network which uses the weights calculated by the weight composing network based on the selected noise reduction level to reduce the noise and upscale the image at the same time. In this manner, the size of the image does not matter and the process is efficient for even very large image sizes. This is advantageous and may result in faster processing over prior systems and techniques that were dependent on the size of the image. For example, the processing time for prior systems and techniques that perform a noise reducing algorithm directly on the image are dependent on the size of the image because the noise reducing algorithm is acting on each of the pixels in the image, which may result in a slower noise reducing process for large images with many pixels. The computations performed in the de-noising process in prior systems are directly proportional to the size of the image. Even for smaller images the prior noise reducing algorithms may be slower because the algorithms act on each of the pixels. In contrast, the single neural network described herein is not acting on each of the pixels in the image, but instead accounts for noise reduction by modifying the weights calculated by the weight composing network being input to the upscaling network. In this manner, the size of the image does not affect the computations performed by the weight composing network and the computations are not directly proportional to the size of the image.

The single neural network is trained to both reduce noise in the image and to upscale the image. That is, the single neural network is trained to perform both tasks jointly. The single neural network is a single compact model that can be deployed or incorporated as part of an application to accept as input an image and noise reduction levels. During training, generated input LR images with various noise levels are paired with corresponding clean HR images. The model is trained on these pairs conditioned on the known noise level. To reduce the model parameters used for different noise levels, a parameter sharing scheme is used that constructs new parameters as the linear combinations of a small set of weight basis. A regularization method is applied to make the training of the shared parameters fast and stable. The single neural network is trained as part of an end-to-end process and can be trained to reduce one or more different types of noise. Each different type of noise reduction level may include a separate user-controllable input in a GUI to set a desired noise reduction level.

The systems and techniques described in this document relating to the single neural network significantly improve the upscaling quality on noisy input LR images. An easy-to-use GUI allows a user to determine the desired trade-off between noise reduction and detail preservation. The single neural network model size is much smaller compared with training multiple, different models for each noise level. The computations performed by the single neural network model trained for different noise levels is similar to models trained for only one noise level. The systems and techniques for the single neural network can be applied to general noise types including, for example, compression noise, quantization noise, sensor noise and other noise types. The systems and techniques for the single neural network also can be applied to different network architectures.

FIG. 1 is a block diagram of a system 100 for converting a LR image having noise artifacts to an HR image using a single neural network. The system 100 includes a computing device 102 having at least one memory 104, at least one processor 106 and at least one application 108. The computing device 102 may communicate with one or more other computing devices over a network 110. For instance, the computing device 102 may communicate with a computing device 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the application 108 and its components used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 110. In one implementation, the application 108 may be an image editing application or application that includes features and functionality to enable image editing and/or image manipulation. The image editing application may be a standalone application that runs on the computing device 102. Alternatively, the image editing application may be an application that runs in another application such as a browser application. The image editing application enables a user to edit and manipulate images.

The application 108 enables a user to convert or upscale a LR image to a HR image. The application 108 also enables the user to reduce or remove noise artifacts or de-noise the LR image as an integrated part of the conversion process. In this manner, the application 108 can simultaneously upscale an input LR image and reduce the noise in the image. The application 108 includes a neural network 112 that is configured to convert the LR image to the HR image and, at the same time, reduce the noise in the LR image. The neural network 112 is a single neural network model (or single neural network) that includes two components: a weight composing network 114 and an upscaling network 116, as discussed in more detail below.

The application 108 also includes a user interface 118 having an upscale tool 119, a noise reduction tool 120 and a display window 122. The user interface 118 includes other elements and components, such as other tools used for image editing and image manipulation and graphic design for use as part of the application 108, which are not described here but which also form a part of the application 108. For instance, the user interface 118 may include a work area to create a design using text and images as well as many tools and layers that may be used to create the design in the work area.

The user interface 118 may access images from the at least one memory 104 or from other storages locations either locally on computing device 102 or remotely on other computing devices accessed across the network 110. The user interface 118 may provide a LR image having one or more noise artifacts to the neural network 112 and, more specifically, to the upscaling network 116. The user interface 118 may include an upscale tool 119 to enable a user to select a desired upscaling level for a selected image. For example, the upscale tool 119 may allow a user to select an upscale factor to upscale the resolution of the image multiple times the original resolution of the image. In this manner, the image is converted from a LR image to a HR image. The upscale factor may be an integer having different values. In some implementations, the upscale factor may include a range of 1 to 4. For instance, if an upscale factor of 2 is selected, the resolution of the original image will be upscaled twice its original resolution. Thus, an image that is 100 pixels×100 pixels will be scaled to a size of 200 pixels×200 pixels.

Additionally, the upscale tool 119 may be used to upscale a portion of an image. The upscale tool 119 may include a selector to select the portion of the image for upscaling by the neural network 112. In this application, image is used to refer to both an entire image and a portion of an image because when input into the neural network 112 for upscaling and de-noising.

The noise reduction tool 120, also referred to as a selector tool, enables a user to select a noise reduction level from multiple different noise reduction levels. The noise reduction tool 120 works in conjunction with the upscaling tool 119 to enable the user to both provide an image for upscaling and to remove noise artifacts from the image as it is being upscaled. The user can control the noise reduction level to choose the best trade-off between noise reduction and detail preservation in the image.

The noise reduction tool 120 provides the noise reduction level to the neural network 112 and more specifically to the weight composing network 114. The noise reduction level may be an integer, for example, an integer between 0 and 100. The weight composing network 114 receives the noise reduction level and determines the optimal network parameter for the selected noise reduction level. The weight composing network 114 provides the network parameter to the upscaling network 116.

In some implementations, the noise reduction tool 120 may include a single selector for selection of a noise reduction level. In some implementations, the noise reduction tool 120 may include multiple selectors with each selector matched with a different type of noise to be reduced. With multiple selectors, the user can select which noise types to perform noise reduction on the image by the neural network. In this manner, the noise reduction tool 114 may provide multiple different noise reduction levels to the neural network 112 for input to the weight composing network 114.

The upscaling network 116 receives the LR image and the upscale factor from the user interface 118. The upscaling network 116 converts the LR image to a HR image and, at the same time, removes one or more noise artifacts from the LR image during the converting using the network parameter provided by the weight composing network 114. The upscaling network 116 outputs the HR image to the user interface 118 for display using the display window 122.

The image conversion process may be repeated for the same image using different noise reduction levels. For instance, the user may want to compare the output HR image results for different noise reduction levels. After upscaling the image a first time using a first noise reduction level, the user may use the noise reduction tool 120 to select a different noise reduction level. The different noise reduction level is input into the weight composing network 114, which determines a different network parameter for the different noise reduction level and provides that different network parameter as input to the upscaling network 116. The upscaling network 116 converts the same LR image to a new HR image and removes one or more of the noise artifacts using the different network parameter during the conversion process. The upscaling network 116 outputs the different HR image for display on the user interface 118 using the display window 122.

Figure 2B:
FIG. 2b is a HR image with a noise reduction level of 80.
Figure 2A:
FIG. 2a is a HR image with a noise reduction level of 0.

Referring to FIGS. 2a and 2b, a LR image of a zebra has been upscaled using the application 108 and the neural network 112. FIG. 2a illustrates the resulting HR image 202 of the zebra using a noise reduction level of 0 and FIG. 2b illustrates the resulting image 204 of the zebra using a noise reduction level of 80. The noise reduction levels were selected using the noise reduction tool 120 and input into the weight composing network 114. The weight composing network 114 determines the optimal network parameter to input to the upscaling network 116 for the select noise reduction level. The upscaling network 116 uses the network parameter to upscale the image and to remove noise artifacts and then outputs the HR image for display in the display window 122 of the user interface 118.

In HR image 202 of FIG. 2a, a low noise level of 0 provides a result with more texture details as well as heavy noise and noise artifacts. While in the HR image 204 of FIG. 2b, a high noise level of 80 can suppress most noises at the expense of losing some fine detail in the image.

Referring back to FIG. 1, the weight composing network 114 determines the optimal network parameter $w_\alpha$ given the noise level $\alpha$. The noise level $\alpha$ is received from the noise reduction tool 120. The weight composing network 114 takes the noise level $\alpha$, which is an integer between 0 and 100 in one example implementation. For each $\alpha$, the weight composing network 114 will output a corresponding weight, also referred to as a network parameter, $w_\alpha \in \mathbb{R}^d$, which is further used to parameterize the upscaling network 116. One straightforward way to do this is to learn 101 individual weights $w_\alpha$. However, this is neither effective for training nor efficient for model storage. Instead, it is assumed that all the $\{w_\alpha\}$ lie in a low dimensional latent space $\mathbb{R}^k$ with k<<101. In this way, each $w_\alpha$ can be represented as $$w_\alpha = W \cdot c_\alpha$$

where $W \in \mathbb{R}^{d \times k}$ is the base weight matrix, $c_\alpha \in \mathbb{R}^k$ is the latent code for noise level $\alpha$.

In some implementations, it is chosen for k=5. In the weight composing network 114, a lookup table layer is used to convert $\alpha$ to $c_\alpha$, and the multiplication with W is just a linear layer. W and $\{c_\alpha\}$ are the learnable parameters in the weight composing network 114. The weight composing network 114 then send the corresponding network parameter to the upscaling network 116. The upscaling network 116 applies the network parameter to create weights that reflect a desired noise level and scaling level.

Figure 3:
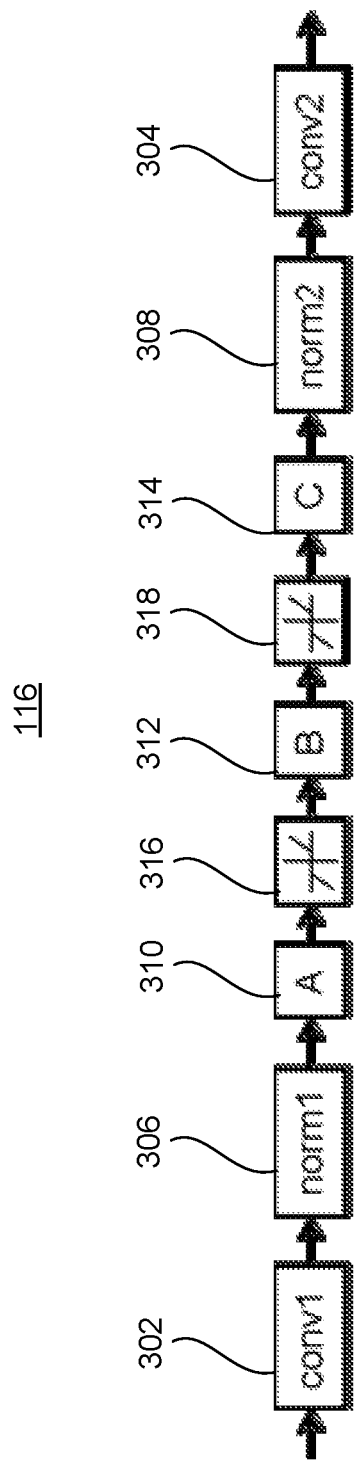
FIG. 3 is a block diagram of an example upscaling network.

Referring to FIG. 3, a block diagram of an example upscaling network 116 is illustrated. The upscaling network 116 can incorporate any deep network based image upscaling method with parameter w for any upscaling factor. FIG. 3 illustrates one example network structure for the upscaling network 116. The upscaling network 116 includes several convolutional layers 302 and 304 interleaved with some non-linear response layers. In FIG. 3, "conv" stands for convolution, "norm" stands for normalization 306 and 308, and A/B/C are linear transforms 310, 312 and 314 with rectified linear activation functions 316 and 318 in between. The convolution and linear layers have learnable parameters, which are generally represented as weight w here.

Referring back to FIG. 1, the neural network 112 may first be trained before it is incorporated as part of the application 108. The weight composing network 114 includes multiple network parameters, where each of the network parameters is shared by multiple different noise reduction levels. In this manner, the overall size of the neural network is kept smaller and compact and provides for easier deployment to computing device 102 as part of the application 108. The compact size of the neural network 112 is due to the training techniques used to train the network. The weight composing network 114 and the upscaling network 116 may be jointly trained using multiple LR images having known different noise levels paired with corresponding high resolution images having no noise.

In one implementation, the neural network may be trained using a different computing device, such as computing device 111, which includes neural network training module 124. To generate training data, general natural images may be used as the paired HR images, then down-sampled with noise added to generate the corresponding noisy LR images. JPEG compression with different quality level may be applied to the LR image as noise corruption. There are 100 JPEG quality levels, with another level added for without any JPEG compression. In this way, there are in total 101 noise levels for $\alpha$. Each triple of (HR image, LR image, noise level) may be saved as one training sample in the neural network training module 124. Data augmentations such as translation and rotation are used as normal.

As mentioned, the upscaling network 116 and weight composing network 114 are jointly trained. In one implementation, they are jointly trained using conventional back propagation, with the root mean square error between the predicted and target HR images as the loss function. As we define $w_\alpha = W \cdot c_\alpha$ where both W and $c_\alpha$ can be learned, there is an ambiguity about the scale of the two variables which may make the learning unstable. To fix this issue, a two-stage learning strategy may be used.

First, k is selected out of the 101 latent codes $\{c_\alpha\}$ and fix these k vectors as the columns in the k×k identity matrix. In this way, the k columns in W are just the network parameters $\{w_\alpha\}$ for the selected k noise levels. We select $\alpha = \{0, 10, 30, 60, 100\}$ to make the weight basis spread over all levels. Once the subset of $\{c_\alpha\}$ is fixed as identity matrix, all the remaining parameters are trained with conventional back propagation. Since the scale of W is properly constrained, training is more stable and efficient.

The network obtained in the first stage may be suboptimal, as we apply a hard constraint to make the latent codes orthogonal to each other for the k selected noise levels. Therefore, in the second stage, the constraint is removed on all latent codes $\{c_\alpha\}$, and fix the W learned from previous stage. Then, the entire network is trained again until convergence. It is observed that after the second stage, prediction accuracy increases noticeably for those noise levels constrained in the first stage.

It is also observed that it is helpful to initialize the column in W corresponding to $\alpha=0$ from the parameters of a model trained on noise-free images. This significantly speeds up training, and sometimes even improves final upscaling quality on other noise levels. This may be because the easier task of noise-free upscaling can serve as a guide for the other more challenging tasks on noisy images. This results is a neural network model size that is much smaller compared with training multiple models for each noise level.

Figure 4:
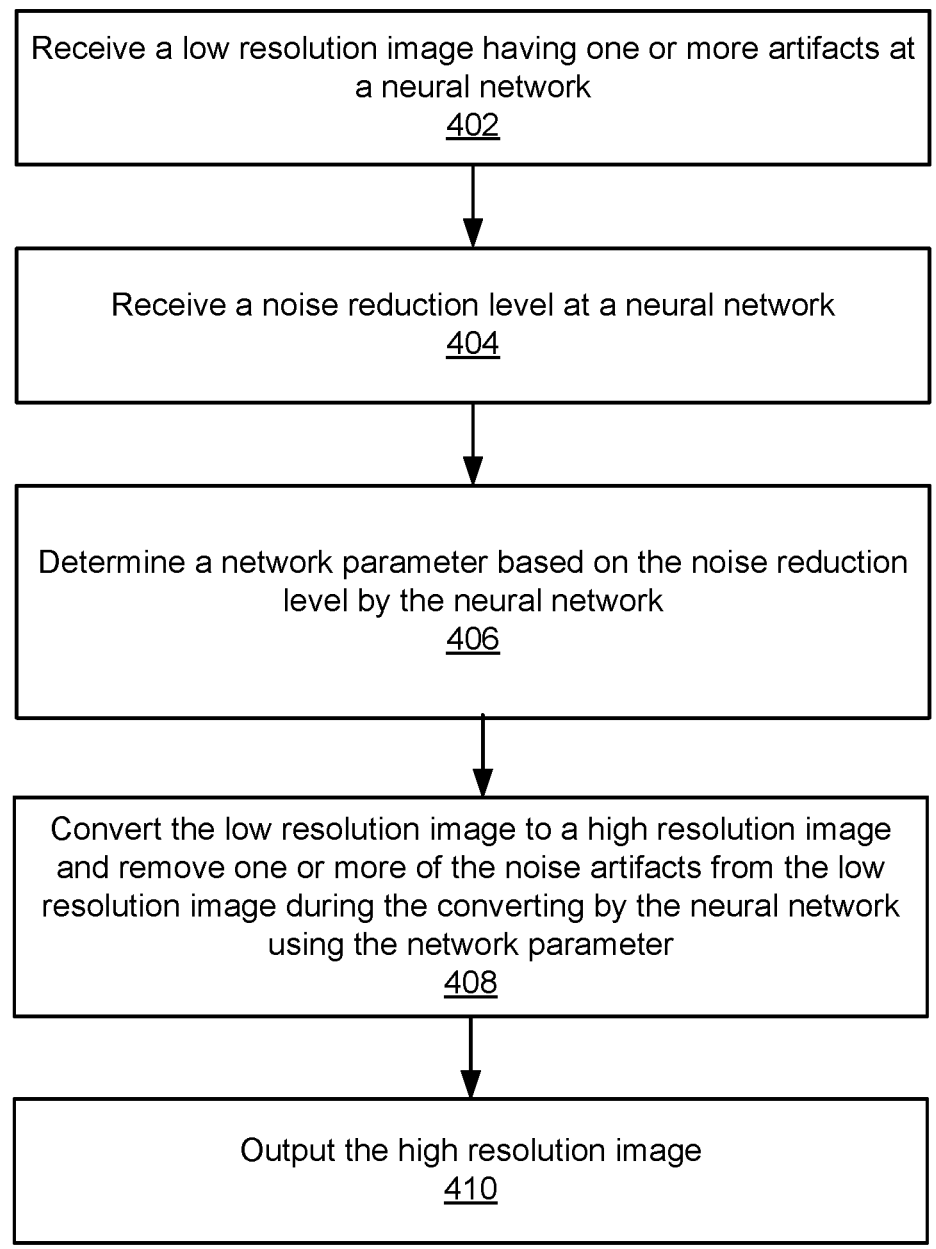
FIG. 4 is an example process illustrating example operations of the system of FIG. 1.

Referring to FIG. 4, a process 400 illustrates example operations of the system 100 of FIG. 1. Process 400 includes receiving a LR image having one or more noise artifacts at a neural network (402). For example, the neural network 112 may receive the LR image. More specifically, the upscaling network 116 may receive the LR image.

Process 400 includes receiving a noise reduction level at a neural network (404). For example, the neural network 112 may receive the noise reduction level. More specifically, the weight composing network 114 may receive the noise reduction level.

Process 400 includes determining a network parameter based on the noise reduction level by the neural network (406). For example, the neural network 112 may determine the network parameter based on the noise reduction level. More specifically, the weight composing network 114 may determine the network parameter based on the noise reduction level.

Process 400 includes converting the LR image to a HR image and removing one or more of the noise artifacts from the low resolution image during the converting by the neural network using the network parameter (408). For example, the neural network 112 converts the LR image to a HR image and removes one or more of the noise artifacts from the low resolution image during the converting using the network parameter. More specifically, the upscaling network 116 converts the LR image to a HR image and removes one or more of the noise artifacts from the low resolution image during the converting using the network parameter.

Process 400 includes outputting the HR image (410). For example, the neural network 112 may output the HR image. Specifically, the upscaling network 116 may output the HR image. The outputting of the image may include simply a transformation of change of the LR image to the resulting HR image.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for converting a low resolution image to a high resolution image, the method comprising:
   receiving, at a neural network, the low resolution image having one or more noise artifacts, the low resolution image selected by a user via a graphical user interface (GUI);
   receiving, at the neural network, a noise reduction level, the noise reduction level selected by a user from a plurality of user-selectable noise reduction levels indicated on the GUI;
   determining, by the neural network, a network parameter based on the noise reduction level;
   converting, by the neural network, the low resolution image to the high resolution image and removing one or more of the noise artifacts from the low resolution image during the converting by the neural network using the network parameter; and
   outputting the high resolution image.

2. The method as in claim 1, wherein converting the low resolution image to the high resolution image and removing one or more of the noise artifacts is performed at a same time by the neural network.

3. The method as in claim 1, wherein the neural network comprises a weight composing network and an upscaling network.

4. The method as in claim 3, wherein determining the network parameter includes determining, by the weight composing network, the network parameter based on the noise reduction level.

5. The method as in claim 4, wherein converting the low resolution image to the high resolution image and removing one or more of the noise artifacts from the low resolution image comprises converting, by the upscaling network, the low resolution image to the high resolution image and removing one or more of the noise artifacts from the low resolution image during the converting using the network parameter determined by the weight composing network.

6. The method as in claim 1, further comprising:
   receiving a different noise reduction level at the neural network;
   determining, by the neural network, a different network parameter based on the different noise reduction level;
   converting, by the neural network, the low resolution image to a different high resolution image and removing one or more of the noise artifacts from the low resolution image during the converting using the different network parameter; and
   outputting the different high resolution image.

7. The method as in claim 6, wherein receiving the different noise reduction level includes receiving the different noise reduction level from one of a plurality of user-selectable noise reduction levels.

8. A system for converting a low resolution image to a high resolution image, the system comprising:
   at least one memory including instructions; and
   at least one processor that is operably coupled to the at least one memory and that is arranged and configured to execute instructions that, when executed, cause the at least one processor to implement an application, the application comprising:
      a graphical user interface (GUI) configured to:
         indicate a selection from a user of the low resolution image having one or more noise artifacts, and
         indicate a noise reduction level selected by a user from a plurality of user-selectable noise reduction levels; and
      a neural network configured to:
         receive the low resolution image and the noise reduction level,
         determine a network parameter based on the noise reduction level,
         convert the low resolution image to the high resolution image and remove one or more of the noise artifacts from the low resolution image during the converting using the network parameter; and
         output the high resolution image for display on the GUI.

9. The system of claim 8, wherein the neural network converts the low resolution image to the high resolution image and removes one or more of the noise artifacts at a same time.

10. The system of claim 8, wherein the GUI comprises a selector tool to select one of the plurality of user-selectable noise reduction levels.

11. The system of claim 8, wherein the neural network comprises a weight composing network and an upscaling network.

12. The system of claim 11, wherein the weight composing network is configured to determine the network parameter based on the noise reduction level.

13. The system of claim 12, wherein the upscaling network is configured to:
   convert the low resolution image to a high resolution image and remove one or more of the noise artifacts from the low resolution image during the converting using the network parameter; and
   output the high resolution image for display on the GUI.

14. The system of claim 8, wherein:
   the GUI is configured to indicate a different noise reduction level selected by the user; and
   the neural network is configured to:
      determine a different network parameter based on the different noise reduction level,
      convert the low resolution image to a different high resolution image and remove one or more of the noise artifacts from the low resolution image during the converting using the different network parameter, and
      output the different high resolution image for display on the GUI.

15. A system for converting a low resolution image to a high resolution image, the system comprising:
   at least one memory including instructions; and
   at least one processor that is operably coupled to the at least one memory and that is arranged and configured to execute instructions that, when executed, cause the at least one processor to implement a neural network, the neural network comprising:
      a weight composing network that is configured to receive a noise reduction level from a user selection of the noise reduction level from a plurality of user-selectable noise reduction levels indicated on a graphical user interface (GUI) and to determine a network parameter based on the noise reduction level; and
      an upscaling network that is configured to:
         receive the low resolution image having one or more noise artifacts from a user selection of the low resolution image via the GUI, convert the low resolution image to the high resolution image and remove one or more of the noise artifacts from the low resolution image using the network parameter from the weight composing network; and output the high resolution image.

16. The system of claim 15, wherein:

the weight composing network comprises a plurality of network parameters, wherein each of the network parameters is shared by multiple different noise reduction levels from the plurality of noise reduction levels.

17. The system of claim 15, wherein the weight composing network and the upscaling network are jointly trained using multiple low resolution images having known different noise levels paired with corresponding high resolution images having no noise.

18. The system of claim 15, wherein the upscaling network is further configured to apply the network parameter to create weights that reflect a desired noise level and scaling level.

* * * * *